United States Patent [19]
Hedger

[11] 4,063,543
[45] Dec. 20, 1977

[54] SERVO TRACKING APPARATUS

[76] Inventor: John Henry Hedger, 1350 Hill St., El Cajon, Calif. 92020

[21] Appl. No.: 713,794

[22] Filed: Aug. 12, 1976

[51] Int. Cl.² .................... F24J 3/02; G03B 21/00; G01J 1/20
[52] U.S. Cl. .................................. 126/270; 353/3; 250/203 R
[58] Field of Search ............... 126/270, 271; 237/1 A; 60/641; 353/3; 250/203 R

[56] References Cited
U.S. PATENT DOCUMENTS

| 2,712,772 | 7/1955 | Trombe | 126/270 X |
| 3,924,604 | 12/1975 | Barak | 126/270 |
| 3,924,604 | 12/1975 | Anderson | 60/641 X |

Primary Examiner—William F. O'Dea
Assistant Examiner—Larry Jones
Attorney, Agent, or Firm—Frank D. Gilliam

[57] ABSTRACT

The servo tracker of the instant invention comprises an apparatus for positioning of a major reflector to compensate for relative movement between the Earth and Sun. A base member supports a movable major reflector and a fixedly positioned minor reflector. The major reflector is movable in both a north/south and east/west direction. When correctly positioned, the major reflector directs the light rays of the Sun toward a major target where useful energy is produced. When correctly positioned, a portion of the reflected light rays from the major reflector are reflected by the minor reflector toward a minor target positioned adjacent a pair of sensors. When the major reflector is improperly positioned due to relative movement between the Sun and Earth, the reflected light rays from the minor reflector are directed toward one of the sensors depending at which axis the major reflector is improperly positioned and the direction required for repositioning to a correct position. When receiving the Sun's light rays, the sensor heats causing expansible fluid within a closed hydraulic system to expand causing a linear actuator connected between the base and one of the axis of the major reflector to actuate and reposition the major reflector until the Sun's rays from the minor reflector are again directed toward the minor target. Both of the axes of movement of the major reflector have a sensor and actuator system. The major reflector is designed to return from a Sun set position by gravity to a position for reflecting the morning light rays of the Sun toward the major target.

12 Claims, 4 Drawing Figures

SERVO TRACKING APPARATUS

BACKGROUND OF THE INVENTION

This invention relates generally to the continued collection of solar energy by a solar energy concentrator that receives reflected light rays from the Sun and more specifically to a self contained and self powered tracker system for continually repositioning of a major reflector during the day as well as seasonal to compensate for relative movement between the Sun and Earth so as to constantly direct the reflective light rays from the Sun toward a solar energy concentrator.

One of the prior art methods is to interconnect a plurality of reflectors by a long rod through lever means so that continual longitudinal movement of the rod will reposition all of the reflectors that amount required to direct their reflected rays toward the concentrator regardless of their distance therefrom. This system requires that all the lever arms be of a different length according to a given reflector movement requirement with respect to various other reflectors both nearer or farther from the solar energy concentrator. There have been various means proposed for the required longitudinal movement of the rod all of these various means require an external source of power.

Another prior art method is to have each reflector surface moved by a separate timing mechanism externally powered interconnected so as to tilt the reflector surface in a path following the relative movement of the Sun and Earth.

These methods have limited acceptability because of complexity of operation sychronization as well as the requirement for an external power for their operation.

SUMMARY OF THE INVENTION

The instant invention provides a self powered sun tracking servo system that is simple in construction, econimical to produce and is self powered, thereby requiring no external source of power.

The apparatus comprises a major positionable reflective surface supported by a fixed base, member and positionable in both north/south and east/west directions. When the major reflector is properly positioned at any given point in time, it will reflect the light rays of the Sun toward a fixedly positioned target for a concentration of solar heat energy. A minor reflector fixedly positioned with respect to the base member reflects a small position of the reflected light rays from the major reflector toward a minor target when the major reflector is properly positioned. When the reflected light rays from the major reflector are off target, the minor reflector reflects the rays from the major target toward one of two sensors. The sensors are interconnected with a closed separate hydraulic system including a linear actuator interconnecting conduit and filled with heat expansible fluid, the reflected light rays impacting either one of the sensor causes the fluid within its closed system to expand forcing the actuator connected thereto to move the major reflectors along one of its directional axis until the light rays from the minor reflector again impact the minor traget. The light rays now being removed from the sensor prevent further expansion of the fluid in the system stopping further movement of the major reflector. As is common to servo systems, the major reflector will tend to hunt moving the reflected light rays from the minor reflector between the sensors and minor target. The major target is of sufficient size that within the servo's range of hunting the major portion of the light rays reflected from the major reflector will impact the major target.

The foregoing and various other features of the invention will appear in the course of the description which is rendered below with reference to the accompanying drawings wherein the same reference numerals depict the identical element or part.

DESCRIPTION OF THE PREFERRED EMBODIMENT

Figure 1:
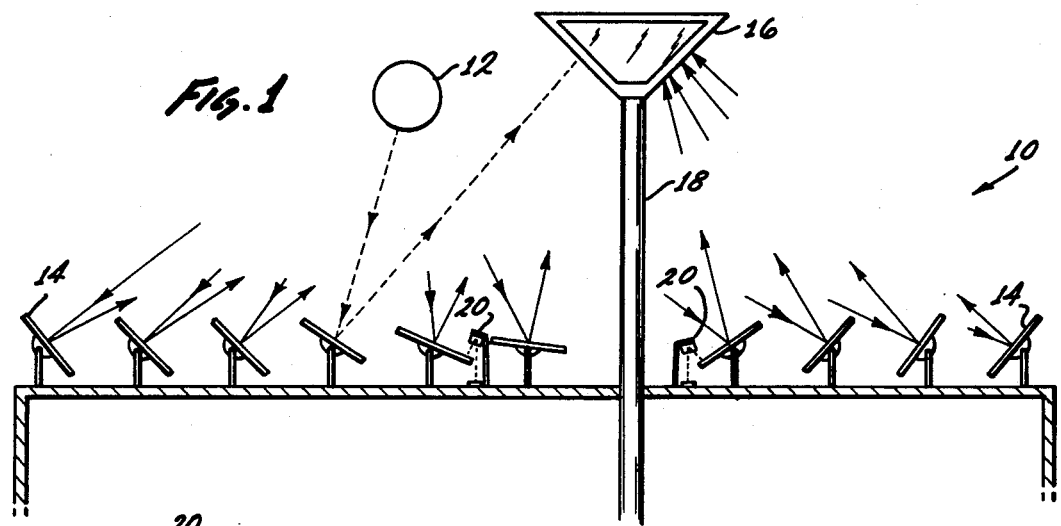
FIG. 1 shows a plurality of reflective surfaces reflecting the light rays from the Sun toward a central solar energy collector.

Referring specifically to FIG. 1, there is shown a completed system 10 utilizing the instant invention for reflecting and concentrating the energy from the light rays of the Sun 12. The system includes a plurality of major reflectors 14 and their associated servo positioning means. The major reflector elements 14 are positioned for directing the reflected light rays of the Sun toward a major target 16. The target 16 is a solar energy concentrator or the like for useful collection of solar energy. The concentrator of the major target 16 may be any conventional type, many of which are well known in the art. Support member 18 supports the target 16 above the surface of the Earth. The heat energy collected at major target 16 is generally transferred to a storage area below the major target (not shown) by convenient means, such as, but not limited to the support member 18 which may be hollow for this purpose.

A minor portion of the reflected light rays directed toward the major target are redirected by a minor reflector 20 toward a minor target 22. Adjacent the minor target 22 are positioned a pair of sensors 24, 26 (see FIG. 2).

Figure 2:
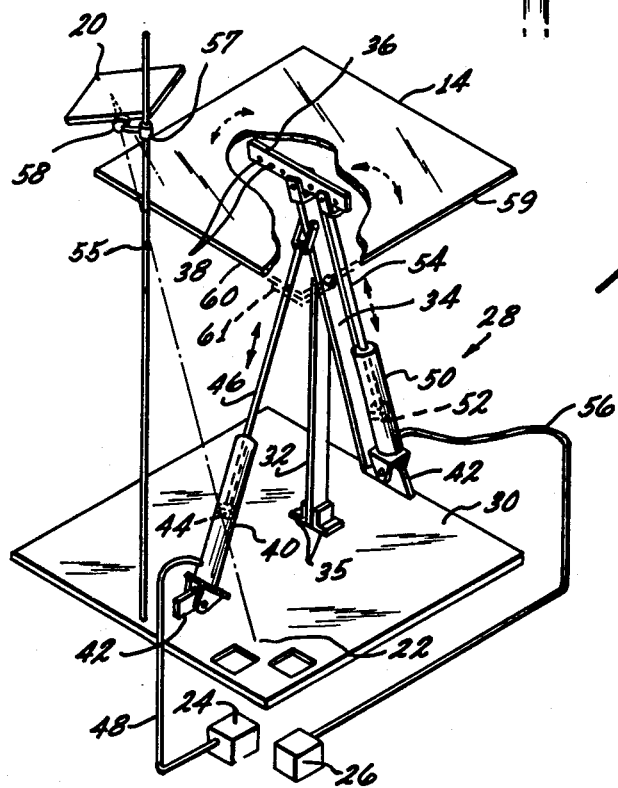
FIG. 2 is a prospective partially cutaway showing the servo device and reflectors.
Figure 4:
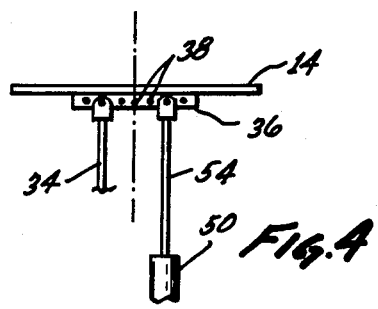
FIG. 4 shows off center attachment means for the major reflector.
Figure 3:
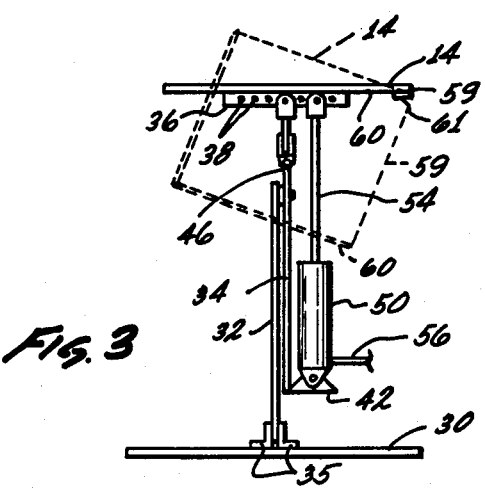
FIG. 3 shows various positions of the major reflector of the device of FIG. 2.

Referring now specifically to FIGS. 2-4, there is shown in detail the various views of reflecting surfaces and associated servo-system components comprising the major reflector 14, minor reflector 20 and servo means for dynamically moving the major reflector 14 to continually compensate for the relative movement between the Sun and Earth during day light hours and seasons so as to maintain the reflected rays from the major reflector 14 toward the major target 16 (see FIG. 1) when Sun light is available.

A base member 30 supports the reflector 14, 20 and the servo system utilized to continually re-position the major reflector 14. The base member 30 is shown as a flat plate with the various components supported thereby. It should be obvious that any suitable configured base member could be utilized. The surface of the Earth alone could successfully support the apparatus to practice the invention.

The major reflector 14 is attached to the base member 30 by a series of support bars or levers. Support lever 32 is fixedly attached to the base member 30 by a pair of cleets 35 and extend upward from the base. A second support bar 34 is pivotly attached to support bar 32.

Support bar 34 is in turn pivotly attached to bar 36 which is secured to the bottom of the major reflector 14 to one of a plurality of apertures 38 therethrough. The apertures 38 provide a means for off center attachment between the bar 36 and support bar 34, the purpose for which is herein after explained.

A linear actuator 40 is pivotly connected to base 30 by securing block 42 at one end and through a piston 44 and connecting rod 36 is pivotly attached to support lever 34 above its pivot connection with support bar 32. The lower inner end of the linear actuator 40 is attached through suitable conduit means 48 to sensor 24 for sensing an improper north/south position of major reflector 14. The sensor may take the form of a solar panel or the like, the conduit and the lower inner portion of the actuator below the piston are sealed and filled with a heat expandable fluid hereinafter explained.

A linear actuator 50 with a piston 52, connecting rod 54, sensor 26 for sensing an improper east/west position and interconnecting conduit 56 including an expandable fluid are interconnected between base 30 and support bar 36 and operate in the same manner as the actuator 40 system explained above.

It should be noted that the invention is not limited to the use of any particular linear actuator as any pressure extendable device could be used such as, but not limited to, a conventional hydraulic actuating bellows, etc.

The minor reflector 20 is supported by member 55 secured either to the base member 30 or the Earth, as shown, by a sleeve 57 and a releasable ball joint lock connection 58 which allows an infinite number of fixed positions both with respect to the upper surface of the major reflector 14 and the support member 55.

The major and minor reflectors 14, 20 respectfully may be glass mirrors or highly polished metal or the like. The fluid within the two closed hydraulic systems is a heat expansible fluid, such as, but not limited to, refrigerant R-11, R-113, methylene cloride or the like. The expansible quality of the fluid is selected so that at ambient temperature at the surface of the base member 30 does not cause the fluid to expand resulting in actuation of the pistons and resulting movement of the major reflector. The fluid is selected so that the ambient temperature plus the added heat provided by the sensors causes the required amount of piston and major reflector movement. It should be noted that in some environments, the sensor is shielded from the direct light rays from the sun by the major or minor reflector.

OPERATION OF THE PREFERRED EMBODIMENT

In initial installation of each major reflector and its servo apparatus, the major reflector is positioned so that the instantaneous reflected Sun's rays impact the surface of the major target (see FIG. 1). While the major reflector is properly positioned in this manner, the minor reflector is fixed in position to reflect a portion of the reflected light rays from the major reflector toward the minor target. The sensor 24, then positioned adjacent minor target 22, so that when north/south reflector movement of the major reflector is required then sensor 24 received the reflected light rays now directed away from the minor target due to the relative movement between Sun and Earth. Likewise, sensor 26 is positioned adjacent minor target 22 so that it receives the reflected light rays directed from the target toward minor reflector 20 when east/west movement of the major reflector is required due to the relative movement of the Sun and Earth.

After the initial set up of the major and minor reflector, sensors and associated servo apparatus, each separate system is ready for use. It can be readily seen that while the reflected light rays from the major reflector are directed toward the major target that the reflected rays from the minor reflector will impact the minor target and no positioning of the major reflector will occur and that when relative movement between the Sun and Earth is detected, then the reflected light rays will move off the major target and the reflected light rays from the minor reflector will move off the minor target towards one of the sensors 24, 26 depending on direction of the relative movement and will cause the expansible fluid in the heated sensor system to expand causing the corresponding linear actuator piston to extend moving the associated major reflector in a direction to return its reflected light rays. Again on target, this will re-position the reflected light rays from the minor reflector 20 back to the minor target and the movement will substantially terminate, slight hunting between sensor and the minor target is normal in a servo system of this type. The continual relative movement of the Sun and Earth will continue to move the major reflector in this manner until Sun set. As stated above, hunting is common in servo systems and will cause the major reflector to have slight continual movement in both the north/south and east/west direction, as the light rays from the minor target are constantly varied between the minor target and the sensors.

At the end of day when the rays of the Sun are directed away from the specific location on Earth, it is desirable to have the major reflector 14 returned to a position wherein it will receive the first light rays from the Sun at morning or sun rise (see FIG. 2). This can be achieved by various means. A weight 61 may be added along adjacent edges 59, 60 (see FIG. 2) as by attaching support lever 34 in an aperture 38 off center so that when the system is cool the major reflector will tip toward the weighted edges or its greater off center condition.

The sensors 24, 26 are of sufficient size so that they will sense the required positioning of the major reflector during all of the day light hours and for seasonal changes during the year.

It should be obvious that even though the preferred embodiment is directed toward tracking relative movement between the Sun and Earth, that the tracking of any relative movement between any light source and any object through the use of movable mirrors can be accomplished equally as well.

It should be understood that the invention herein described provides a novel means for positioning a major reflector surface to compensate for the relative movement between the Sun and Earth to enable the reflected light of the Sun to be continously directed toward a major target throughout daylight hours that is inexpensive, accurate and requires no external source of power for its operation.

Various modifications of the instant invention, in addition to those shown and described herein, will become apparent to those skilled in the art from the foregoing description and accompanying drawings. Such modifications are intended to fall within the scope of the appended claims.

What is claimed is:

1. Apparatus for tracking any relative movement between a light source and a fixedly positioned object comprising:
   a first and second target member;
   a positionable reflector means for reflecting the light rays of the light source toward a first target member;
   a fixedly positioned reflector means positioned intermediate said first target member and said positionable reflector for reflecting at least a portion of the light rays from the light source reflected by said positionable reflector means toward a second target when said first reflector means is correctly positioned;
   sensor means for receiving said reflected light rays from the light source from said second reflector means when said reflected light rays from the light source are directed away from said first and second targets due to said relative movement, said sensor means increases in temperature when said reflected light rays from the light source are directed thereon; and
   positioning means for moving said positionable reflector in response to a rise in temperature of sensor means in a direction and to the extent required for returning said reflected light rays toward the first and second target wherein the temperature of said sensor will be reduced and the movement of said positionable reflector means will substantially terminate until a predetermined degree of said relative movement is again detected.

2. The invention as defined in claim 1, wherein said first target member is a solar energy concentrator.

3. The invention as defined in claim 1, wherein said positionable and said fixedly positioned reflector means are mirrors.

4. The invention as defined in claim 1, wherein said positionable and said fixedly positioned reflector means are highly polished metal.

5. The invention as defined in claim 1, wherein said second target member is at a fixed location on the Earth.

6. The invention as defined in claim 1, wherein said sensor means comprises at least one solar energy collector substantially smaller than said positionable reflector means.

7. The invention as defined in claim 1, wherein said positioning means comprises conduit means interconnecting said sensor means and said positioning means, said conduit means, said sensor means and at least a portion of said positioning means containing a heat expansible fluid.

8. The invention as defined in claim 1, wherein said sensor means and said positioning means move said positionable reflector in both a north/south and an east/west direction.

9. The invention as defined in claim 1, wherein said sensor means comprises a pair of solar energy collectors and said positioning means comprises two separate closed systems each system comprising conduit means interconnecting one of said solar energy collectors and a linear actuator each of said separate closed systems containing heat expansible fluid.

10. The invention as defined in claim 1, wherein said positioning means is returned from a maximum extended position to a minimum extended position in the absence of said light rays from the Sun.

11. An apparatus for tracking the relative movement between the Sun and Earth comprising:
    a solar energy concentrator;
    a target positioned on Earth;
    a positionable reflector for reflecting the light rays from the Sun in a first direction toward said solar energy concentrator;
    a fixedly positioned reflector for reflecting a portion of said light rays from said first direction toward said target;
    a pair of solar energy collectors positioned adjacent said target, one of which will receive said light rays from said fixedly positioned reflector corresponding to the direction of said relative movement causing said light rays to be directed away from said target, said one of said solar energy collector panels will increase in temperature due to said light rays directed thereon; and
    positioning means responsive to the increase in temperature of said one of said solar energy collective panels for moving said positionable reflector until said light rays are again directed toward said concentrator and said target wherein said one of said solar energy panels will reduce in temperature substantially terminating movement of said positionable reflector.

12. The invention as defined in claim 11, wherein said reflector is returned from a Sun set to a Sun rise position by gravity.

* * * * *